Jan. 6, 1942.   W. C. ANDERSON   2,268,632
METHOD OF PLOTTING GREAT CIRCLE COURSES AND APPARATUS
Filed Sept. 8, 1938   2 Sheets-Sheet 1

INVENTOR
WILLIAM C. ANDERSON
BY
Orton & Griswold
ATTORNEYS

Jan. 6, 1942.    W. C. ANDERSON    2,268,632
METHOD OF PLOTTING GREAT CIRCLE COURSES AND APPARATUS
Filed Sept. 8, 1938    2 Sheets-Sheet 2

INVENTOR.
WILLIAM C. ANDERSON
BY
ATTORNEYS.

Patented Jan. 6, 1942

2,268,632

UNITED STATES PATENT OFFICE 2,268,632

METHOD OF PLOTTING GREAT CIRCLE COURSES AND APPARATUS

William C. Anderson, Montclair, N. J.

Application September 8, 1938, Serial No. 228,885

11 Claims. (Cl. 33—1)

The invention relates to a method of plotting great circle courses between two points on a map of a portion of the earth's surface and to apparatus for use in practicing the method. The present disclosure is intended for use in connection with maps which are provided with flat portions and with flap portions hinged thereto, as are more fully disclosed in my copending application Serial No. 97,426 filed August 22, 1936, issued as United States Patent No. 2,155,387 dated April 25, 1939, and the present disclosure constitutes a further development and improvement in the method of forming great circles directly on the map in the manner disclosed in the copending application.

In the prior application a method of procedure was suggested for forming great circle courses between two or more points on the particular form of map therein disclosed, and there was also disclosed a form of protractor for use in making adjustments in the lines indicating the great circle course as the lines pass from one to the other side of the hinged flaps. In the prior application disclosure the desired great circle courses were plotted directly on the map and, of course, such plotting operations had to be performed with that degree of accuracy which characterizes the plotting of courses by navigation methods now in general use.

The primary object of the present disclosure is to provide for a simplification of the practice over that suggested in the prior application and to provide a great circle finding protractor and a set of templates each disclosing a different great circle course which can be constructed originally with any desired degree of mathematical accuracy; which can be quickly applied to the portion of the map containing the two points desired to be connected by a great circle line and by means of which the proper great circle connecting the points may be marked on the map in a few minutes and without necessity of practicing methods of procedure which are quite apt to develop errors and inaccuracies especially under the stress and necessity of rapid work.

Still another object of the invention is to provide a simple means for ascertaining requisite data relative to any particular great circle course and relative to different points along the course such, for instance, as the distance between the two points and the azimuth of different points along the course so plotted.

With reference to the apparatus aspect of the disclosure an object of the invention is to provide a simple set of plotting instruments including a protractor and a set of templates provided with charts or diagrams drawn to the scale of the map on which they are used, which instruments are light in weight, capable of being easily manipulated and on which the charts and other data are plainly visible and on which the several charts and lines may be formed with any desired degree of mathematical exactness as a factory proposition.

Various other objects and advantages of the invention will be in part obvious from a consideration of the method features of the disclosure and from an inspection of the accompanying drawing and in part will be more fully set forth in the following particular description of one method of practicing the invention, and the invention also consists in certain new and novel modifications of the preferred method and other features of construction and combination of parts hereinafter set forth and claimed.

In general the apparatus necessary for plotting a great circle course between two points of the earth's surface as herein featured includes, of course, a map of the portion of the earth containing the two points to be connected by the great circle lines, specifically a form of map including flap hinge portions. With the map there is used a protractor provided with a great circle locus chart formed of a large number of great circles, preferably ninety, one for each different angle which ninety great circles would make with the equator, and, preferably, a set of templates one for each great circle course shown on the protractor and an edge of which template is fashioned to serve as a pencil guide for drawing the ascertained great circle through the two points on the map.

Figure 1:
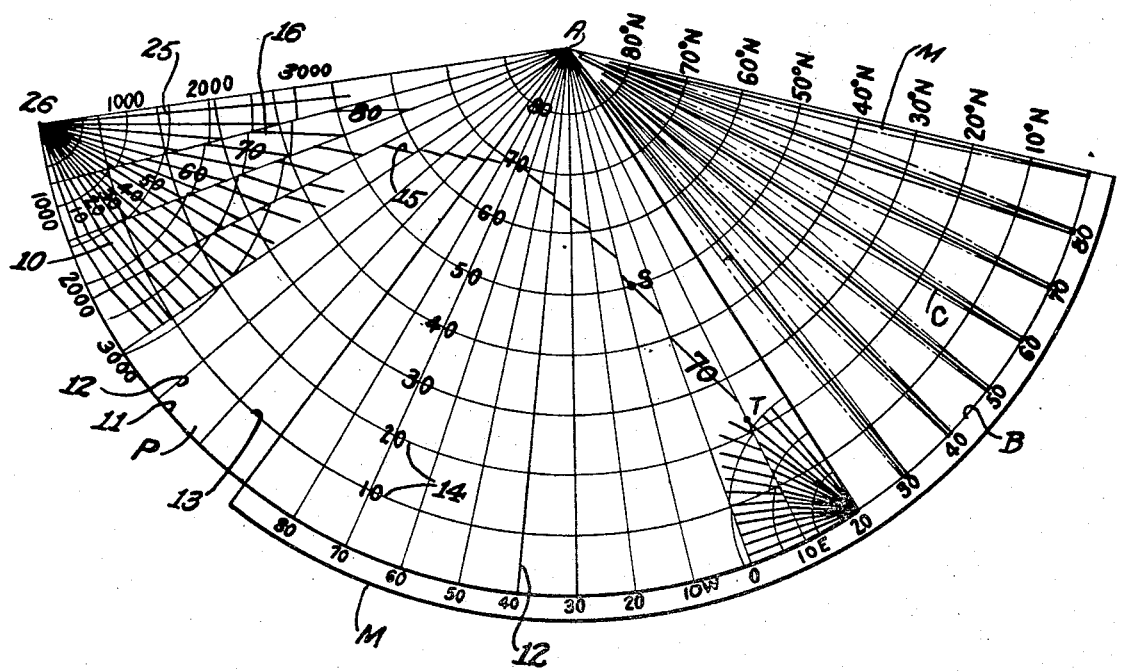
Fig. 1 is a view in plan showing a map of the hinged flap type partially covered by a transparent protractor provided with a great circle locus chart and through which points on the map are visible.

In the drawings and referring first to Fig. 1 there is shown a map M of a portion of the earth's surface and which is conventionally marked with lines radiating from the pole A and intersecting the equator B, the portion shown extending from 180° between 90° E. and 90° W.

There is also shown the parallels of latitude at 10° intervals and conventionally designated. Distances along the equator B are laid off to true scale and the length of each element of the conic surface, that is the distances along the meridian, are scaled equal to the length of the meridians of longitude of the surface of the earth. Each element of longitude is provided with a flap C hingedly connected with the longitudinal element as its base and arranged so that it may be folded down to either side of the element in parallel relation to the map surface as indicated on the exposed portion of the map and otherwise the map corresponds to the map disclosed in the above identified patent.

The protractor P is a transparent sheet of Celluloid on which is printed, engraved, or otherwise depicted a great circle locus chart 10. This chart is of segmental form with the convex edge 11 having a length corresponding to 180° on the map M. The chart 10 includes radially disposed longitudinal lines 12, like the map spaced the equivalent of 10° apart and also provided with concentric latitude lines 13 of which the equator B is one and which latitude lines, like the map, are spaced 10° apart. In general, it is understood that the locus chart on the protractor is drawn to the same scale as the longitude and latitude lines on the map. For matters of convenience in identifying the latitude lines, the several longitude lines are marked from the equator line to the pole by designation 14 as the corresponding latitude lines on the map.

The protractor is provided with a plurality of great circle course lines one of which is shown at 15, preferably one for each degree of angle between 0 and 90° at which the great circle lines intersect the equator. To simplify illustration only the beginnings of the great circle courses other than 15 are shown at 16.

The locus chart is carefully prepared conveniently at the factory from a master chart which in turn has been carefully formed on a map such as the map M by the method defined in the above identified patent.

Since the distances along the elements of the map and between the outside edges of the flaps are drawn to true scale, a straight line between any two points from the surface bounded by the outside edge of the adjacent flaps when turned away from one another, parallel to the map surface, will be the shortest distance between these two points on the surface of the earth and will consequently lie in a great circle of the earth's surface. To form, for instance, any of the great circle courses marked 16, opposite ends of the line are drawn toward each other from points 180° apart and having the same angularity with the equator. For instance, considering the course marked 70 in Figs. 1 and 2, the ends of the course line intersect the equator at points 180° apart and with an included angle of 70° with the equator, and each end extends therefrom to the equator in a straight line to the next adjacent flap.

As noted in the above identified copending patent, in order to pass from one side to the other of any given flap in drawing a great circle course an angular adjustment is required due to the construction of the flap. Such angular adjustment varies with the spaces of the meridian intervals and with the latitude or the point at which the passing takes place. This variation is determined in the following manner:

The angular adjustment is equal, at any given point of latitude, to twice the angle formed by the edge of the flap with a line parallel to the base of the flap at that point. This angular adjustment can be measured by dividing the variation in the height of the flap in the vicinity of the point in question by the latitudinal distance in which the variation takes place, the resulting quotient being the tangent of half the angle of adjustment.

In the instant case, the long lines forming the ends of the great circle lines 15, specifically designated 70, cross the next adjacent latitude line inwardly from opposite ends at about latitude 20°. At this point the height of the flap equals a scale distance of 56 miles. Selecting a longitudinal distance of 1°, equal to 69.15 miles, the height of the flap at 21° latitude equals a scale distance of 57.8 miles. The tangent of half the angle of adjustment then equals $$\frac{57.8 - 56.0}{69.15} \text{ or } .02603$$

Half the angle of adjustment equals 1° 30′, therefore the angle of adjustment equals 3° in this instance, and so on, with each portion of the line extending straight adjacent longitudinal lines and stepped at the longitudinal line. In the instant case for the 10° longitudinal interval shown in the drawing the adjustment is 6° 4′ at the equator, decreasing to 0 at 40° parallel of longitude and then increasing to 3° 38′ at the 89th parallel of longitude. The angular adjustment from 0° to 40° of latitude is concaved towards the poles, and the angular adjustment from 40° to 89° of latitude is convex towards the poles.

These calculations are repeated for each division of longitude on which a flap has been erected and thereby the complete great circle course for a given angle of inclination at the equator is obtained. Preferably courses at one degree intervals are provided on the great circle locus chart. It will be noted that the great circle course on the chart is formed by a broken line with breaks at each point where the course crosses a longitude corresponding to a flap. In Fig. 1 the great circle locus chart has its right edge at 20° E. longitude. The 70° great circle course continues as a straight line until it intersects the 10° E. longitude line at slightly above the 20° N. latitude line, at this point it is assumed that the flap C is flat against the map surface and extending toward the 0° longitude. The 70° line continues until it reaches the edge of the flap and conveniently the locus chart protractor P may have a perforation at the end of the first segment of the line through which a pencil mark may be made on one side of the flap and near the edge. The second segment of the 70° course line assumes that the flap just mentioned is reversed and extends toward the 20° longitude line E. The point marked at the edge of the flap which was then west of the 10° E. longitude line is now east of the line therefore the second segment of the 70° course starts on the same latitude position but at a point which appears to be east of the line. Since the map is on both sides of the flap the point where the first segment ends and the second segment begins is the same geographically. The remainder of the course is continued in the same manner and by the use of perforations at the end of the segments any desired great circle course may be outlined on the map surface.

In the embodiment of the locus chart as shown in Fig. 1 there are in addition to the lines representing latitude and longitude those for each great circle course and distances. To avoid confusion contrasting colors may be used for the various sets of lines or alternate lines in a set may be differently colored. For most purposes the protractor with the great circle course chart will not be used for marking a course but for selecting a course which may then be marked by using the templates of Fig. 2.

The great circle locus chart may also be constructed from the computation, by spherical trigonometry, of the latitudes of points along the several great circle courses, at selected longitudinal intervals from the origin, and plotting the great circle course points with the latitudes and longitudinal intervals as co-ordinates.

For example: To plot great circle course 70 making any angle of 70° with the Equator, the latitudes may be computed at 5 degree longitudinal intervals, beginning with the point of origin of the course at the Equator. The spherical triangle for the first longitudinal interval, or departure, is a spherical right triangle, having for its base, $b$, an angular distance of 5 degrees along the Equator, for its hypotenuse, $c$, the angular distance along the great circle course, for its altitude, $a$, the latitude of the course at the 5 degree longitudinal interval, for the angle, A, between the base and the hypotenuse, 70°, and for the angle, C, between the base and the altitude, 90°.

By spherical trigonometry:

$$\tan A \text{ equals } \frac{\tan a}{\sin b}$$

or $$\tan a \text{ equals } \tan A \sin b$$

A equals 70°, $b$ equals 5°, Required $a'$
log tan 70° equals 0.43893
log sin 5° equals 8.94030 log tan $a'$ equals 9.37923
$a'$ equals 13°, 28′, or, since 1° of latitude equals 69.15 miles, $a'$ equals 931 miles.

Therefore, a point on great circle course 70, at a longitudinal interval, or departure, of 5° from its origin, will be located 13° 28′ or 931 miles, above the Equator.

Continuing, for a 10° longitudinal interval, or departure, A equals 70°, $b$ equals 10°, Required $a''$.

For a 15° longitudinal interval, or departure, A equals, 70°, $b$ equals 15°, Required $a'''$.

And so on, up to A equals 70°, $b$ equals 90°, when $a$ will equal 70°.

It is also suggested that the great circle courses may be plotted using the protractor shown in Fig. 4 of the copending application.

The protractor herein illustrated may be used in several ways. First, let it be assumed that there are two places or points on the map visible through the protractor P as points S and T; that they lie in the same hemisphere, either northern or southern; that they are on the same side of the 180° meridian and that the difference in longitude between the two points is less than 180°. In this case the protractor is placed on the map with the pole of the protractor coinciding with the pole A of the map and in which position, of course, the parallels of latitude of the locus chart coincide with the parallels of latitude of the map. The chart is then slowly revolved about the coinciding poles as a center until the two points S and T either appear exactly on the same great circle or make their nearest approach to some one of the great circles drawn on the protractor. In the illustrated instance the protractor P was rotated toward the left and shifted back and forth until it was found that the great circle line marked "70" was that great circle line which passed through or was closest to both of the points S and T. Noting that this ascertained great circle was the 70° great circle, that is, was the great circle which intersects the equator at an included angle of 70°, the protractor is laid aside in those cases where the template hereinafter described is to be utilized as the next step in the plotting operation. It is obviously possible, however, to transfer from the protractor to the proper position on the map either all of the great circle so ascertained as being the proper great circle as by means of transfer paper, or by other known means of transferring contours from one sheet to another, or the portion of such great circle as may be located between the points S and T.

Figure 2:
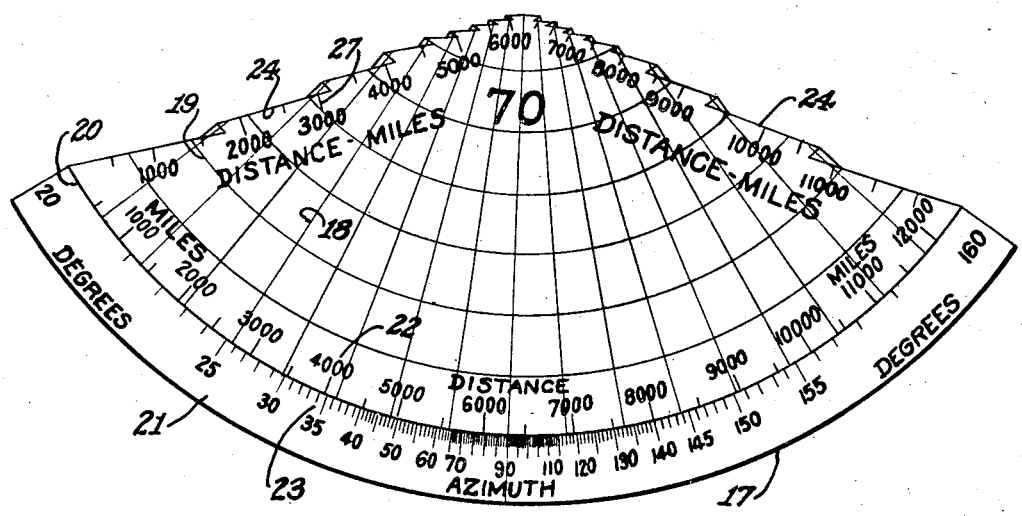
Fig. 2 is a view in plan showing one of a set of associated templates, in this case a template of that great circle which forms an angle of 70° with the equator.

In the preferred manner of practicing the method herein disclosed, there is provided a set of templates of which one is shown in Fig. 2, there being one for each of the great circle courses disclosed on the protractor P. In the suggested arrangement of one course for each 1° of angle between 1° and 90° which the great circle makes with the Equator, there would be a set of ninety templates. Of course, if greater refinement and accuracy are required, the single degree of variation in angularity may be subdivided into degrees and minutes and even seconds. As the different templates distinguish from each other only in the configuration of the great circle course defining its pencil guiding edge and in the data thereon, the description of any one will be sufficient for the other.

The template 17, shown in Fig. 2, corresponds in exact detail to the area and configuration of that portion of the protractor which lies between the 70° great circle line 15 and the Equator line 11, and like the protractor is scaled into radial longitudinal lines 18, latitude lines 19, of which one forms the Equator line 20. The convex side of the template is provided with an extension forming a scale margin 21 to accommodate data or other reading. On one side of the Equator line is provided a scale 22 of distances in miles and on the opposite side of the Equator is formed a scale 23 of azimuth in degrees and extending from about 20° to 160° on the Equator.

In using the template it is located on the map until the points S and T desired to be connected by a great circle appear at the broken line or stepped edge 24 of the template in that position when the Equator line 20 of the template coincides with the Equator line B of the map, or, differently expressed, whenever the pole of the template and, which in the instant case is outside of its physical outline, coincides with the pole A of the map. Then, by using the portion of the edge 24 which extends between the points S and T as a pencil guide, the desired great circle course may be marked directly on the map.

Reverting back to the use of the protractor, and considering the situation where the two points to be connected lie in the same hemisphere but on opposite sides of the 180° meridian and the difference in longitude between the two points being less than 180°, the procedure is to move the point nearest to the 180° meridian an even number of longitudinal intervals, in the instant case 10° intervals, towards and past the meridian so that the new position lies on the opposite side of the 180° meridian from its original position, its latitude being maintained the same as its original latitude. Then the other point is moved an equal number of longitudinal intervals in the same direction that the first point was moved, likewise its latitude being maintained as its original latitude. Connecting the two new points as hereinbefore outlined will give the great circle required which may then be drawn between the two original points on the map.

Considering the situation where the two points to be connected lie in opposite hemispheres, one in the northern hemisphere and the other in the southern hemisphere, one of the two points is moved to a position in the opposite hemisphere corresponding to its position in its own hemisphere, that is, having the same longitude and latitude equal in amount but in opposite directions. Considering now the two points in the same hemisphere by trial the protractor is shifted as above outlined until it occupies two consecutive positions and such that the same great circle which in the first position passes through one of the two points and intersects the Equator at one end of its base will, in the second position, intersect the Equator at the same point but at the other end of its base and pass through the other of the two points. This will give the great circle required and it may then be drawn between the original two points.

It is suggested in the showing of the protractor that a series of distance lines 25 may be superposed thereon. These lines indicate distances measured along the great circle which they intersect measuring from the origin 26 being the left hand point at which all the course lines 15 intersect the Equator.

In operation and in order to measure the great circle distances between any two points on the map separated by a number of the flaps, the protractor is placed by the method hereinbefore described so that the same great circle passes through both points. The distance from each point to the nearest distance line is scaled, the interval of distance denoted by the difference of the distance lines is noted, and by appropriate addition or subtraction, the distance between the two points is determined. These same distance lines may be also formed on the template as indicated by the scale 27 marked along the guide edge 24.

Figure 3:
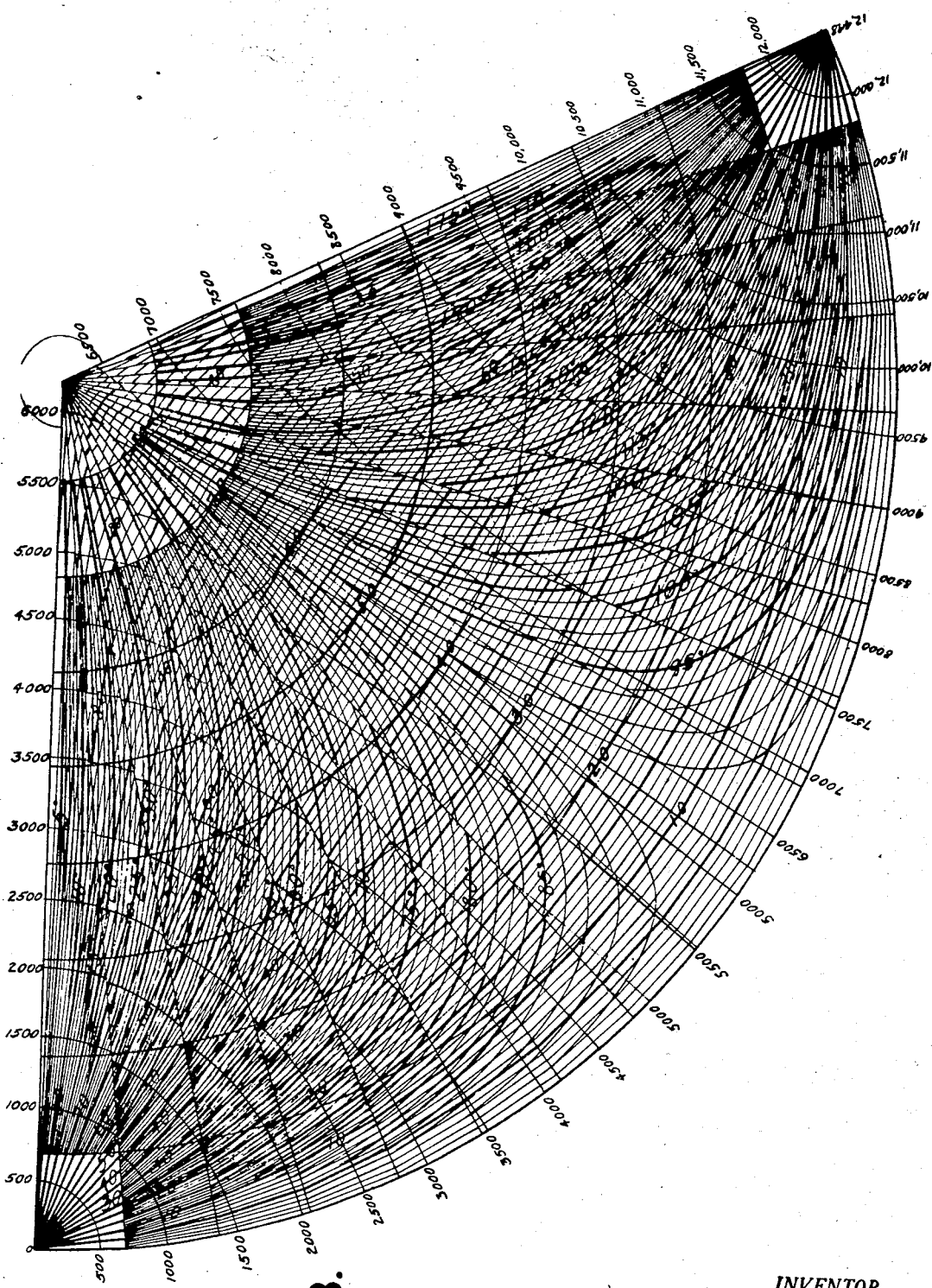
Fig. 3 is a view in plan showing a protractor of the type shown in Fig. 1 modified by the inclusion of azimuths.

In Fig. 3 is illustrated a modification of the locus chart protractor that to a certain extent combines the features of both the locus chart of Fig. 1 and the template of Fig. 2. This locus chart has or may have all of the elements of the Fig. 2 locus chart including the great circle course lines, with holes at appropriate intervals to mark a map beneath, and the distance lines with the further aid to navigation of azimuth lines.

The position on the locus chart of each of the azimuth lines is determined by computation, for each great circle course. The points thus determined are plotted on the great circle course lines and corresponding points, similarly determined, on each of the great circle course lines are joined. In Fig. 3 the azimuth lines are the heavy lines extending from each end of the protractor toward the pole and numbered from 5° to 175°; computations for the position of the azimuth lines are made from the formula for spherical right triangles, as follows:

The angles of the spherical triangle are A, B, and C; the sides are $a$, $b$, and $c$; all measured in degrees.

$$\cos c \text{ equals } \cot A \cot B$$

where A equals the great circle course angle, in degrees; where B equals the given azimuth in degrees; and $c$ equals the distance along the great circle course from the course origin in degrees. Thus, to illustrate finding the position of the 60° azimuth on the 42° great circle course, A equals 42° and B equals 60°.

cos c equals cot 42 degrees cot 60 degrees log cot 42 deg. equals_____ 0.04556
log cot 60 deg. equals_____ 9.76144 log cot c equals_____ 9.80700 −10 c equals 57 degrees, 20 min. equals 3480 miles on the surface of the earth or 3480 miles from the Equator along the 42° great circle course.

By constructing the chart in the manner described, the intersection of any given azimuth line with any given great circle course line indicates the azimuth of the great circle course at the point of intersection. Thus the azimuth, or angle between a north and south line and the great circle course line measured in a clockwise direction from the north, of great circle course 13, that is the great circle course at an angle of 13° from the Equator at the point distant 5,000 miles from the course origin, is 86°; and the azimuth of great circle course 42, at a point distant 3480 miles from the course origin, is 60 degrees.

As the variation in azimuth along any great circle course is regular for short distances, and the locus chart is drawn to a single scale, by interpolation the azimuth from the azimuth lines.

The azimuth indicated by the azimuth lines is for the direction along the great circle course from left to right on the locus chart, or west to east in the Northern Hemisphere and east to west in the Southern Hemisphere. For the reverse direction, right to left on the locus chart, east to west in the Northern Hemisphere and west to east in the Southern Hemisphere, 180 degrees is added to the azimuth indicated by the azimuth lines. Thus, the azimuth of great circle 13, at a point 5,000 miles distant from the course origin, for the reverse direction, would be 86 degrees plus 180 degrees, or 226 degrees; and the azimuth of great circle course 42, at a point 3480 miles from the course origin, for the reverse direction, would be 60 degrees plus 180 degrees, or 240 degrees.

It will thus be evident that the protractor of Fig. 3 may be used in place of the protractor of Fig. 1 and the template of Fig. 2 but is preferably used in conjunction with the latter.

While there have been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. A device for use with a map of a portion of the earth's surface provided with means thereon indicating latitudes and longitudes, comprising a template of generally segmental form provided with means adapted to coincide with a latitude line of the map and intersecting radial longitude lines depicted thereon on the same scale, respectively, as the corresponding lines of longitude on the map whereby the template may be located accurately on the map with the latitude means of the template coinciding with the corresponding latitude on the map, one edge of the template defining a broken line indicating a great circle course to the scale of said map and having straight portions between the longitude lines and stepped portions at the longitude lines connecting the adjacent straight portions whereby the broken line edge may be utilized as a pencil guide to mark on the map the great circle course defined by said edge.

2. A device for use with a map of a portion of the earth's surface formed as the developed surface of a cone and provided with means thereon indicating latitude and longitude, and flaps hingedly secured along elements of the conic surface the free edges of which represent meridians of longitude, comprising a template of generally segmental form provided with means adapted to coincide with a latitude line of the map and with indications of longitude depicted thereon on the same scale, respectively, as the corresponding lines of longitude on the map whereby the template may be located accurately on the map with the latitude means of the template coinciding with the corresponding latitude on the map, one edge of the template comprising straight and stepped portions which enable the user to draw a broken line indicating a predetermined great circle course on said map and comprising straight portions between the lines of longitude and stepped portions at the lines of longitude connecting the adjacent straight portions whereby the broken line edge may be utilized as a guide to mark on the map the great circle course defined by said edge.

3. A device for use with a map of a portion of the earth's surface formed as the developed surface of a cone and provided with means thereon indicating latitude and longitude, and flaps hingedly secured along elements of the conic surface the free edges of which represent meridians of longitude comprising a template of generally segmental form provided with means adapted to coincide with a latitude line of the map and with indications of longitude depicted thereon on the same scale, respectively, as the corresponding lines of longitude on the map whereby the template may be located accurately on the map with the latitude means of the template coinciding with the corresponding latitude on the map, one edge of the template comprising straight and stepped portions which enable the user to draw a broken line indicating a predetermined great circle course on said map and comprising straight portions and stepped portions connecting the adjacent straight portions whereby the broken line edge may be utilized as a guide to mark on the map the great circle course defined by said edge.

4. A device for use with a map of a portion of the earth's surface formed as the developed surface of a cone and provided with means thereon indicating latitude and longitude, and flaps hingedly secured along elements of the conic surface the free edges of which represent meridians of longitude, comprising a template of generally segmental form provided with means adapted to coincide with a latitude line of the map whereby the template may be located accurately on the map with the latitude means of the template coinciding with the corresponding latitude on the map, one edge of the template comprising straight and stepped portions which enable the user to draw a broken line indicating a predetermined great circle course on said map and comprising straight portions and stepped portions connecting the adjacent straight portions whereby the broken line edge may be utilized as a guide to mark on the map the great circle course defined by said edge.

5. A device for determining great circle courses comprising, in combination, a sheet having depicted thereon a portion of the earth's surface formed as the developed surface of a cone and intersecting lines representing latitude and longitude and flaps hingedly secured along elements of the conic surface and whereof the edges are so formed as to represent true meridians of longitude when two adjacent flaps are turned away from one another in parallel relationship with the sheet, and a template of generally segmental form provided with means adapted to coincide with a latitude line of the map and with indications of longitude depicted thereon on the same scale, respectively, as the corresponding lines of longitude on the map whereby the template may be located accurately on the map with the latitude means of the template coinciding with the corresponding latitude on the map, one edge of the template comprising straight and stepped portions which enable the user to draw a broken line indicating a predetermined great circle course on said map and comprising straight portions and stepped portions connecting the adjacent straight portions whereby the broken line may be utilized as a guide to mark on the map the great circle course defined by said edge.

6. A device for determining great circle courses comprising, in combination, a sheet having depicted thereon a portion of the earth's surface formed as the developed surface of a cone and intersecting lines representing latitude and longitude and flaps hingedly secured along elements of the conic surface and whereof the edges are so formed as to represent true meridians of longitude when two adjacent flaps are turned away from one another in parallel relationship with the sheet, and a template of generally segmental form provided with means adapted to coincide with a latitude line of the map and with indications of longitude depicted thereon on the same scale respectively, as the corresponding lines of longitude on the map whereby the template may be located accurately on the map with the latitude means of the template coinciding with the corresponding latitude on the map, one edge of the template comprising straight and stepped portions which enable the user to draw a broken line indicating a predetermined great circle course on said map and comprising straight portions between the lines of longitude and stepped portions at the lines of longitude connecting the adjacent straight portions whereby the broken line edge may be utilized as a guide to mark on the map the great circle course defined by said edge.

7. A device for determining great circle courses comprising, in combination, a sheet having depicted thereon a portion of the earth's surface formed as the developed surface of a cone and intersecting lines representing latitude and longitude and flaps hingedly secured along elements of the conic surface and whereof the edges are so formed as to represent true meridians of longitude when two adjacent flaps are turned away from one another in parallel relationship with the sheet and a sheet of transparent material of sector shape whereof the arcuate edge is of a length equal to the length of a predetermined line of latitude on the first mentioned sheet and of a radius of curvature equal to the radius of curvature of said line of latitude, said last mentioned sheet having depicted thereon a broken line corresponding to a great circle course on the portion of the earth's surface depicted on said first named sheet.

8. A device for determining great circle courses comprising, in combination, a sheet having depicted thereon a portion of the earth's surface formed as the developed surface of a cone and intersecting lines representing latitude and longitude and flaps hingedly secured along elements of the conic surface and whereof the edges are so formed as to represent true meridians of longitude when two adjacent flaps are turned away from one another in parallel relationship with the sheet and a sheet of transparent material of sector shape whereof the arcuate edge is of a length equal to the length of a predetermined line of latitude on the first mentioned sheet and of a radius of curvature equal to the radius of curvature of said line of latitude, said last mentioned sheet having depicted thereon a broken line corresponding to a great circle course on the portion of the earth's surface depicted on said first named sheet, straight portions extending between the longitudinal lines on the sheet and extending therebeyond a distance equal to the depth of the flap at the point of intersection of such straight portion with the edge of a flap.

9. A device for determining great circle courses comprising, in combination, a sheet having depicted thereon a portion of the earth's surface formed as the developed surface of a cone and intersecting lines representing latitude and longitude and flaps hingedly secured along elements of the conic surface and whereof the edges are so formed as to represent true meridians of longitude when two adjacent flaps are turned away from one another in parallel relationship with the sheet and a sheet of transparent material of sector shape whereof the arcuate edge is of a length equal to the length of a predetermined line of latitude on the first mentioned sheet and of a radius of curvature equal to the radius of curvature of said line of latitude, said last mentioned sheet having depicted thereon a plurality of broken lines corresponding to great circle courses on the portion of the earth's surface depicted on said sheet.

10. A device for determining great circle courses comprising, in combination, a sheet having depicted thereon a portion of the earth's surface formed as the developed surface of a cone and intersecting lines representing latitude and longitude and flaps hingedly secured along elements of the conic surface and whereof the edges are so formed as to represent true meridians of longitude when two adjacent flaps are turned away from one another in parallel relationship with the sheet and a sheet of transparent material of sector shape whereof the arcuate edge is of a length equal to the length of a predetermined line of latitude on the first mentioned sheet and of a radius of curvature equal to the radius of curvature of said line of latitude, said last mentioned sheet having depicted thereon a plurality of broken lines corresponding to at least one great circle course on the portion of the earth's surface depicted on said sheet, said last named sheet being formed with an aperture at an end of at least one segment of the broken line through which a mark may be made on the first mentioned sheet.

11. A device for determining great circle courses comprising, in combination, a sheet having depicted thereon a portion of the earth's surface formed as the developed surface of a cone and intersecting lines representing latitude and longitude and flaps hingedly secured along elements of the conic surface and whereof the edges are so formed as to represent true meridians of longitude when two adjacent flaps are turned away from one another in parallel relationship with the sheet, and a sheet of transparent material of sector shape whereof the angle at the vertex equals the angle between elements of the conic surface on the map which represent one hundred and eighty spherical degrees on the surface of the earth and whereof a side edge is of a length equal to the length of a line of longitude on the first mentioned sheet, said last mentioned sheet having depicted thereon a plurality of broken lines corresponding to at least one great circle course on the portion of the earth's surface depicted on said sheet.

WILLIAM C. ANDERSON.